United States Patent [19]

Wang

[11] Patent Number: 4,935,129

[45] Date of Patent: Jun. 19, 1990

[54] CLOSURE DEVICE FOR A SCUPPER DRAIN

[76] Inventor: Kung-Hsi Wang, 2F, 71-, Tung Ping Rd., Tung Ping Tsun, Tai Ping Shiang, Taichung Shien, Taiwan

[21] Appl. No.: 326,068

[22] Filed: Mar. 20, 1989

[51] Int. Cl.⁵ .................. B01D 35/02; B01D 33/00
[52] U.S. Cl. ........................ 210/131; 49/371; 114/182; 210/163; 220/334; 404/2
[58] Field of Search .............. 52/12; 210/161–166, 210/170, 232, 474, 131, 154; 114/182; 404/2, 4; 220/334; 49/371; 248/147

[56] References Cited

U.S. PATENT DOCUMENTS

| 286,951 | 10/1883 | McBee | 210/163 |
|---|---|---|---|
| 595,949 | 12/1897 | Johnson | 210/163 |
| 945,534 | 1/1910 | Hill | 210/164 |
| 999,305 | 8/1911 | Gurnett | 210/131 |
| 1,137,516 | 4/1915 | Moon | 210/164 |
| 1,522,885 | 1/1925 | Heinkel | 210/163 |
| 2,889,928 | 6/1959 | Sisk | 210/163 |
| 2,970,697 | 2/1961 | Larson et al. | 210/163 |
| 3,884,809 | 5/1975 | Logsdon | 210/163 |
| 4,032,456 | 6/1977 | Berce | 210/474 |

FOREIGN PATENT DOCUMENTS

| 266480 | 7/1962 | Australia | 210/163 |
|---|---|---|---|
| 248430 | 12/1987 | European Pat. Off. | 404/2 |
| 3511067 | 10/1986 | Fed. Rep. of Germany | 404/2 |
| 7900164 | 7/1980 | Netherlands | 210/164 |
| 374424 | 3/1973 | U.S.S.R. | 210/164 |

*Primary Examiner*—Frank Spear
*Assistant Examiner*—Joseph Drodge
*Attorney, Agent, or Firm*—Bacon & Thomas

[57] ABSTRACT

The passage of a scupper drain is normally maintained in a closed position by a pair of spring-biased semi-circular pivotal flaps which are mounted within a housing provided with an associated cap, thus permitting the flaps to only pivot downwardly for opening the drain to water discharge and preventing vermin from leaving the drain when the flaps are disposed in the closed position.

3 Claims, 3 Drawing Sheets

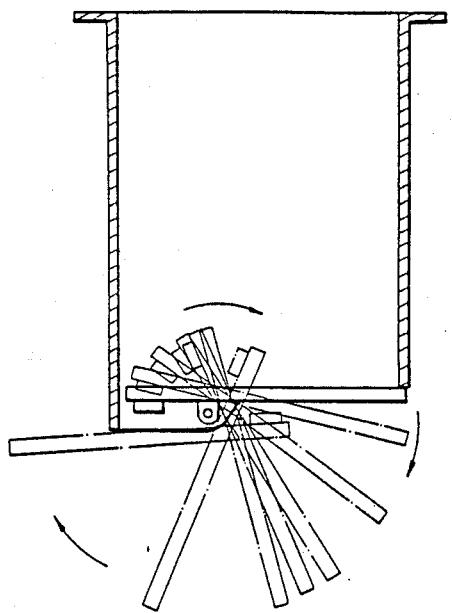
FIG. 4A
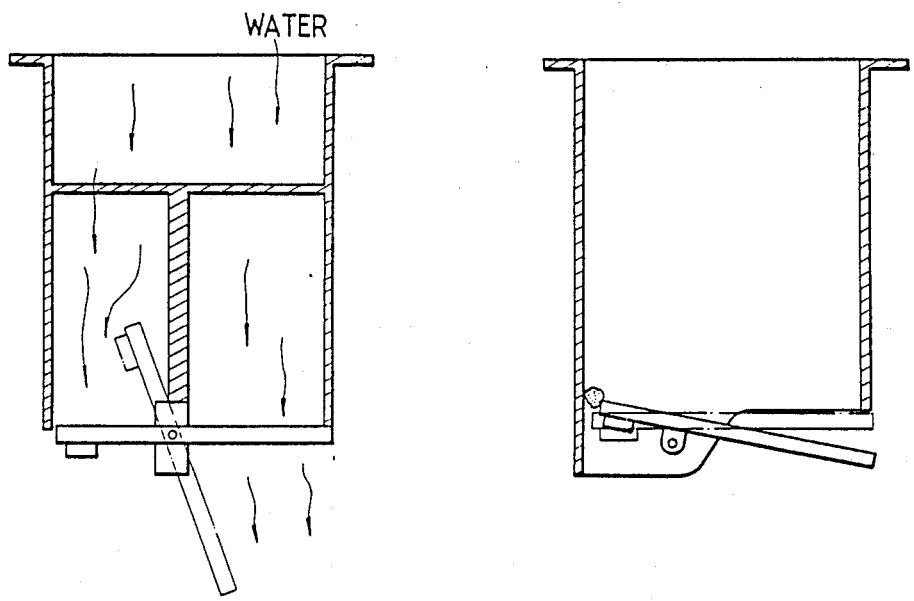
FIG. 4B
FIG. 4C

CLOSURE DEVICE FOR A SCUPPER DRAIN

BACKGROUND OF THE INVENTION

The present invention is to provide a closure device for a scupper drain and, more particularly a closure device which is normally maintained in a closed position to automatically close a scupper drain onto which the device is mounted. The device is comprised of two semi-circular pivotal flaps which form a swinging door having a size substantially equal to the inner diameter of the associated scupper drain passage. The swinging door is further supported by two springs which retain the door in a normal closed position before or after dirty water is discharged.

In regular water troughs or scuppers, water discharging pipes are normally connected at the bottom. After a certain period of application, debris accumulated inside the scupper to receive flies, cockroaches, reptiles or vermin. The scuppers may become a dead corner in environmental sanitation. At night, reptiles and vermin may come out from the scuppers to seek food, and simultaneously, to promote diseases. It is known to insert a cap to close up the scupper so as to prevent from passing therethrough of reptiles and vermin and also to prevent release of bad odor from the water discharging pipe.

In addition to a regular cover cap for directly covering the scupper, there is also known a kind of weight controlled swinging door used to control the scupper. The cover cap is very inconvenient in use, since it must be picked up for water discharging and reinstalled in the scupper each time after water is discharged.

As shown in FIG. 4, a known weight controlled swinging door includes a pin rod to pivot a swinging door to a scupper with a weight provided at the shorter side of the swinging door so that the swinging door is constantly kept in a normal closed condition.

This kind of weight controlled swinging door still has the following drawbacks.

1. Because the swinging door has a weight attached thereto at one side, during water discharging the side of the swinging door where the weight is connected is projected upward and the other side of the swinging door is pushed downward. If the rushing force of the discharging water is uneven against the swinging door or if there is any miscellaneous objects carried with the dirty water, the upward projecting angle of the swinging door may be forced to exceed an angle of 90°, thereby causing the swinging door to be turned upside-down (as shown in FIG. 4-A).
2. In order to prevent the swinging door from turning upside-down, a stopping means must be set above the swinging door. The arrangement of such a stopping means is rather inconvenient and will also reduce the water discharging area of the scupper (as shown in FIG. 4-B).
3. Because a regular filter cap, which is mounted on the top of a scupper, has bigger filter holes, miscellaneous objects tend to follow dirty water running downward from the scupper into the water discharging pipe. In case the miscellaneous objects are detained by the side of the swinging door where the weight is connected, the swinging door may not be able to close (as shown in FIG. 4-c).
4. In order to provide high sensitivity to facilitate water discharging, the weight connected side and the non-weight side of the swinging door are very close in weight. Therefore, reptiles may easily push the weight connected side of the swinging door upward so as to open the swinging door, thereby reducing the effectiveness of the swinging door.

Neither the said cover cap nor the weight controlled swinging door is fully automatic. A user shall have to constantly pick up and insert the cover cap for water discharging or to set the weight controlled swinging door into the correct position each time it is retained by miscellaneous objects and is rendered unable to close the scupper. Furthermore, this device cannot prevent from passing therethrough of reptiles and vermin, thus threatening environmental sanitation and human health.

SUMMARY OF THE INVENTION

The main object of the present invention is to provide a closure device for a scupper drain, wherein the two pivotal flaps set in a scupper are supported by a tensile force created by spring means to form a normally closed swinging door to close up the scupper, the door being automatically opened by means of water pressure or water gravity for discharging of water.

Another object of the present invention is to provide a closure device for a scupper drain, wherein there is provided a swinging door formed from two pivotal flaps which are prohibited from opening upward by a scupper cap and designed to specifically swing downward for water discharging and thereby prevent reptiles or vermin from leaving the scupper.

Other objects, features and advantages of the present invention will become more apparent from the following detailed description considered in conjunction with the annexed drawings.

BRIEF DESCRIPTION OF THE DRAWINGS

FIGS. 4-A-B-C are schematic drawings of the prior art which uses a weight to control the swinging door.

DETAILED DESCRIPTION OF THE PREFERRED EMBODIMENT

Figure 1:
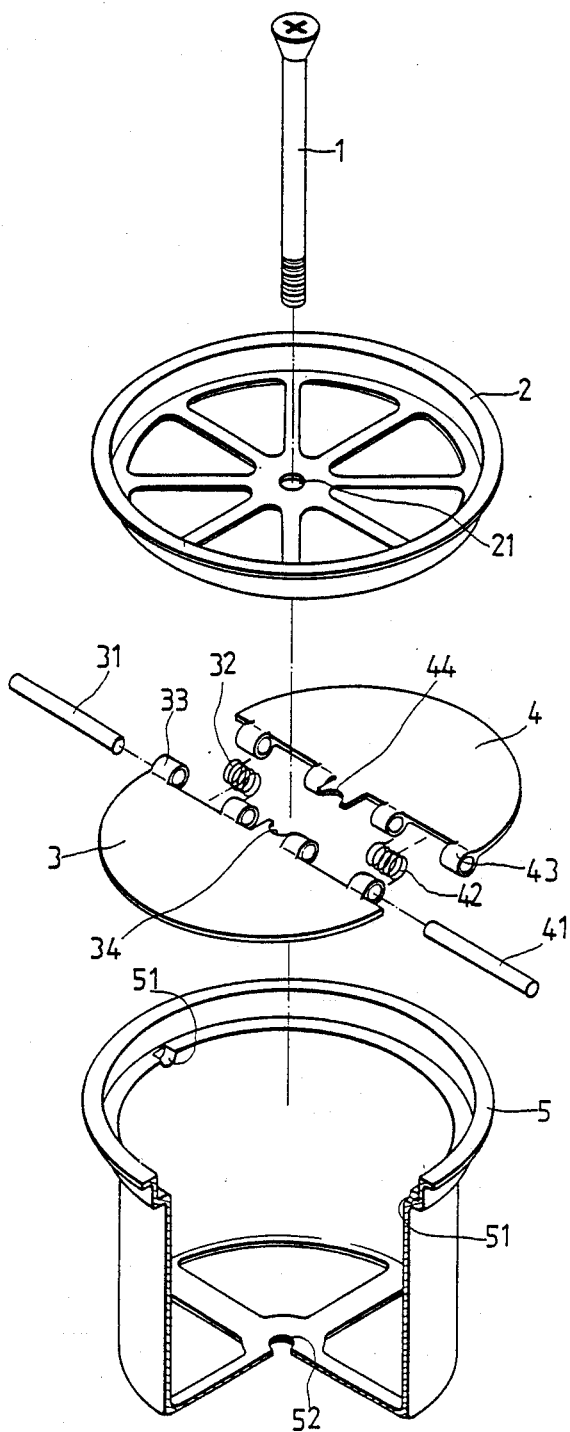
FIG. 1 is a perspective exploded view of the present invention.

Referring to FIG. 1, a closure device for a scupper drain is comprised of two semi-circular pivotal flaps (3) and (4), two pin rods (31) and (41), two springs (32) and (42).

Figure 3:
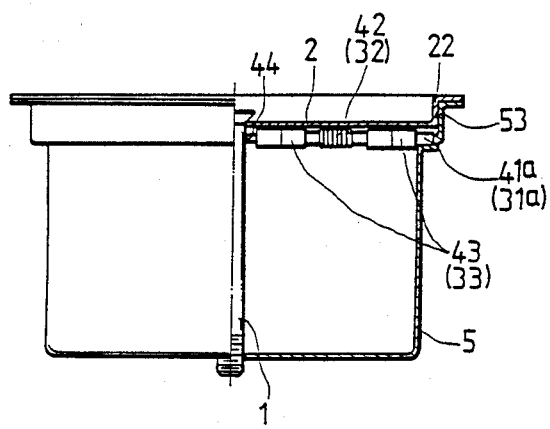
FIG. 3 is a side sectional view of the present invention.

The two semi-circular flaps (3) and (4) each comprises respectively a plurality of hinge barrels (33) and (43) which collectively define a cylindrical passage such that the two semi-circular flaps (3) and (4) are pivotally connected by means of the two pin rods (31) and (41) through a knuckle joint to collectively form a swinging door. After the two pin rods (31) and (41) are respectively inserted through the cylindrical passage formed by the hinge barrels (33) and (43) to connect the two semi-circular loose blades (3) and (4) together to define a diametrical pivot axis, the outer terminal ends (31a) and (41a) protrude beyond the swinging door formed, as shown in FIG. 3, for positioning at the two opposite notches (51) made at the upper portion of the inner wall of a scupper housing (5) which is mounted on the scupper drain. According to the present invention, the swinging door has a diameter substantially equal to the inner diameter of the associated scupper housing (5). The swinging door thus assembled is further mounted on the scupper housing (5) and firmly set thereinside by means of the two pin rods (31) and (41) respectively, each inserted with one end into a bilateral pin hole (51). The two springs (32) and (42) each is set in a gap formed between two adjacent hinge barrels (33) and (43) of the respective flaps (3) or (4), as shown in FIG. 1, with both ends of each spring being engaged against the bottom of the two flaps (3) and (4) respectively, so as to urge the flaps (3) and (4) a normally closed position.

Figure 2:
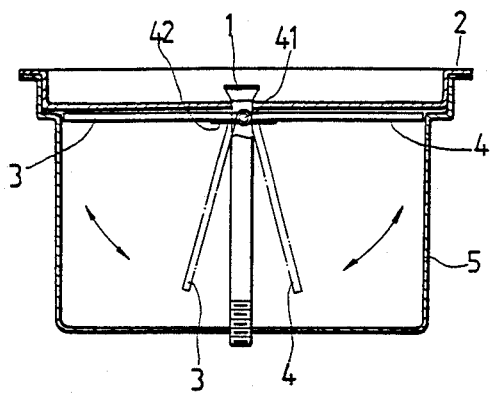
FIG. 2 is a front sectional view of the present invention.

Because the swinging door which is comprised of the two flaps (3) and (4) is set below a filter cap (2), it is allowed to only swing downward below cap (2) and prohibited from swinging upward. Therefore, if any reptiles or vermin attempt to push the swinging door upward, the swinging door will engage and be stopped by filter cap (2) against upward movement. The filter cap (2) is mounted on the top of the housing (5), having a center hole (21) for insertion therethrough of a screw bolt (1). The flaps (3) and (4) each includes a semi-circular notch (34) or (44). When the two flaps (3) and (4) are connected together to form a knuckle joint, the two semi-circular notches (34) and (44) form into a round hole. When in assembly, the screw bolt (1) is inserted from the center hole (21) through the round hole of the notches (34) and (44) for threaded engagement with the bottom bolt hole (52) of the the housing (5) (as shown in FIGS. 2 and 3).

In lieu of a screw joint, the filter cap (2) and the scupper housing (5) may be connected by means of a key slot joint assembly, that is, the housing (5) includes slots (53) integrally made on its inner wall at the upper end to match with respective keys (22) made on the circular side wall of the filter cap (2), so as to let the housing (5) and the filter cap (2) be retained together (as shown in FIG. 3). According to this embodiment, the pin rods (31) and (41) may comprise a single pin extending between notches (51) and the springs (32) and (42) may include a single spring (not shown) since flaps (3) and (4) do not require semi-circular notches (34) and (44).

According to the present invention, closure device for a scupper drain provides the following advantages:
1. Because the pivotal flaps are specifically designed to only open downward, they are prohibited from being pushed upward by reptiles or vermin.
2. Because the pivotal flaps are exclusively designed to open downward, the flaps are protected from becoming stuck and any impurities or waste objects will follow the dirty water to discharge outward.
3. No additional means is required to prevent the flaps from pivoting upwardly because of the presence of cap (2).
4. The flaps are kept in a normal closed position and are automatically opened downward for water discharging when water is present, thereby sending the device easy to install.

The present invention provides a closure device for a scupper drain comprised of two springs for maintaining two flaps in a normal closed position, which has been proven very practical and economical during testing.

I claim:

1. A closure device for a scupper drain comprising:
   (a) a housing configured for mounting on a scupper drain and defining a drain passageway therethrough;
   (b) a pair of semi-circular flaps extendable across the drain passageway and provided with a plurality of cooperating hinge barrels which collectively form a cylindrical passage;
   (c) at least one pin rod disposed through the cylindrical passage for pivotally mounting the flaps within the drain passageway and defining a pivot axis about which the flaps may be pivoted between an upward closed position and a downward open position;
   (d) cap means disposed on the housing above the flaps and engageable by the flaps in the upward closed position; and
   (e) spring means for maintaining the flaps in the upward closed position and permitting the flaps to pivot toward the downward open position for discharging water through the drain.

2. The closure device of claim 1 wherein:
   (a) each flap further includes a semi-circular notch, whereby the notches collectively define a circular opening;
   (b) a threaded bolt disposed through the circular opening for securing the cap means to the housing; and
   (c) a a pair of pin rods disposed through the cylindrical passage, each pin rod including an end extending outwardly from the passage and disposed in engagement with the housing.

3. The closure device of claim 1 wherein:
   (a) the cap means and housing each including cooperating engageable means for securing the cap to the housing; and
   (b) the pin rod being extendable completely through the cylindrical passage and outwardly at the opposite ends thereof for engagement with the housing.

* * * * *